United States Patent [19]

Schneider

[11] 4,132,130

[45] Jan. 2, 1979

[54] SAFETY FLYWHEEL

[76] Inventors: James C. Fletcher, Administrator of the National Aeronautics and Space Administration, with respect to an invention of Richard T. Schneider, Gainesville, Fla.

[21] Appl. No.: 760,057

[22] Filed: Jan. 17, 1977

[51] Int. Cl.² .................. F16F 15/30; B60T 11/10; F16F 9/06

[52] U.S. Cl. .................................. 74/572; 415/9; 416/2; 303/92; 188/151 A; 188/269

[58] Field of Search ............ 74/572, 573, 573 F, 74/574; 415/9, 18, 174; 416/2; 303/1, 3, 4, 92; 188/151 R, 151 A, 264 CC, 269, 280, 290

[56] References Cited

U.S. PATENT DOCUMENTS

| | | | |
|---|---|---|---|
| 860,336 | 7/1907 | Schultz | 74/572 |
| 1,634,897 | 7/1927 | Davis | 415/9 |
| 2,738,647 | 3/1956 | Hill | 415/9 |
| 2,836,981 | 6/1958 | Karatzas et al. | 74/5 |
| 2,952,440 | 9/1960 | Tiraspolsky et al. | 415/9 |
| 3,069,137 | 12/1962 | Barr | 415/9 X |
| 3,145,970 | 8/1964 | Treirat | 415/9 |
| 3,248,952 | 5/1966 | Beach | 74/5 |
| 3,401,567 | 9/1968 | Boswell | 74/5 |
| 3,410,030 | 11/1968 | McHenry | 415/9 X |
| 3,574,325 | 4/1971 | Agarwal | 188/290 X |
| 3,591,308 | 7/1971 | Blattner et al. | 415/9 |
| 3,662,619 | 5/1972 | Seeliger | 74/572 |
| 3,724,288 | 4/1973 | Jakubowski | 74/572 |
| 3,977,273 | 8/1976 | Ernst et al. | 74/572 |

FOREIGN PATENT DOCUMENTS

| | | | |
|---|---|---|---|
| 145117 | 10/1903 | Fed. Rep. of Germany | 188/290 |
| 440514 | 6/1972 | U.S.S.R. | 74/572 |

*Primary Examiner*—Benjamin W. Wyche
*Assistant Examiner*—Don E. Ferrell
*Attorney, Agent, or Firm*—Nina M. Lawrence; John R. Manning

[57] ABSTRACT

An inertial energy storage device is disclosed employing a safety flywheel which is made of flexible material such as a twisted rope ring. The rigidity required for such a device is achieved through centrifugal forces inherent in such a device when it is operating. A small number of the strands of the rope ring have a tensile strength that is lower than the vast majority of the strands of the rope ring whereby should any of these strands fail, they will begin to whiplash allowing such a failure to be detected and braked before a castastrophic failure occurs. This is accomplished by the inclusion of glass tubes located around the periphery of the flywheel. The tubes are in communication with a braking fluid reservoir. The flywheel and glass tubes are enclosed within a vacuum-tight housing. The whiplashing of a broken strand breaks one or more glass tubes. This causes the housing to be flooded with the braking fluid thereby braking the rotation of the flywheel. The design of the flywheel makes it self centering and self balancing thereby avoiding the existence of a dangerous critical frequency.

12 Claims, 1 Drawing Figure

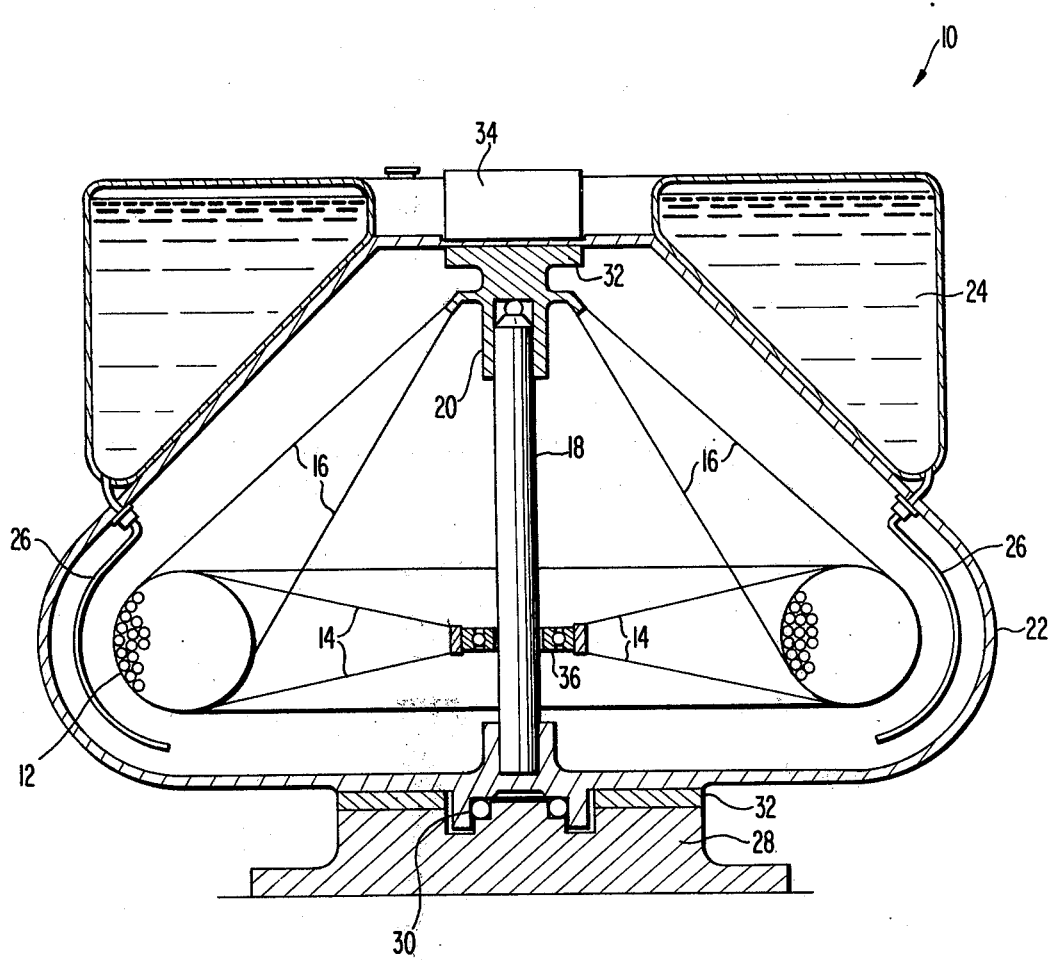

SAFETY FLYWHEEL

ORIGIN OF THE INVENTION

The invention described herein was made in the performance of work under a NASA contract (grant) and is subject to the provisions of Section 305 of the National Aeronautics and Space Act of 1958, public law 85-568 (72 Stat. 435, 42 U.S.C. 2457).

BACKGROUND OF THE INVENTION

1. Field of the Invention

This invention relates to an inertial energy storage device employing a non-rigid flywheel.

2. Description of the Prior Art

There is presently a great and long sought need for efficient and long lasting energy storage devices. Inertial energy storage devices appear to have the capability of meeting this need.

One of the requirements of inertial energy devices such as flywheels is that they have high tensile strength per unit of mass. The energy stored in a flywheel is linearly proportional to the mass of the flywheel and proportional to the square of the angular velocity of the flywheel. A flywheel of this nature can store ten times as much energy as an electric battery of the same weight.

Composite flywheels of synthetic materials are well known. Flywheels fabricated from those fibers bonded by a resin, however, have proved to have problems with delamination and subsequent catastrophic failure. Such a failure is caused by the fact that the fibers and the resin have different elastic properties which causes delamination due to different expansion under stress.

The Wetherbee (U.S. Pat. No. 3,602,067) and Reinhart (U.S. Pat. No. 3,296,886) patents both disclosed flywheels made of laminated plastics while the Call (U.S. Pat. No. 3,496,799) patent discloses a flywheel of homogeneous metallic material. All of these designs employ a rigid material whereas the present invention uses non-rigid material. The desired rigidity of the present invention is caused by centrifugal force alone. By using non-rigid materials, the present invention greatly reduces the amount of vibration which can be transmitted from the flywheel to the shaft due to its non-rigid suspension thereby greatly increasing the lifetime of the inertial energy storage device.

Another disadvantage of existing inertial energy storage devices employing rigid material is their inherent propensity towards catastrophic failure. Such a catastrophic failure could be especially bad should it occur in a moving vehicle. The sudden great torque applied to the vehicle frame by such a failure could cause the vehicle to go out of control. The present invention, on the other hand, is designed to prevent such a catastrophic failure. The Seeliger patent (U.S. Pat. No. 3,662,619) discloses a fail-safe rotating machine wherein predetermined failure locations are designed into the rotating element to assure minimum energy release upon failure of the element due to the centrifugal forces acting thereon. More specifically, a cylindrical flywheel mounted on a motor shaft is formed of juxtaposed discs having varying tensile strengths to inhibit simultaneous failure of the discs. Should any one disc fracture, the fractured segment would be free to be thrown from the flywheel by centrifugal force. The dislodged segment then tends to inhibit rotary motion of the motor by welding to the interior surface of the flywheel shield and jamming between the periphery of the flywheel and the interior of the shield. such a catastrophic failure might seriously damage both the remaining portion of the flywheel and, perhaps more seriously, the adjacent electric motor.

In the present invention, an element of the flexible material comprising the flywheel is of a lesser tensile strength than the remaining material. For example, one or more strands of rope, or parts thereof, will be of lesser tensile strength than the rest of the rope. The element of lesser tensile strength is used merely as a probe and its mass is but a small percentage of the flywheel mass. The probe element will be activated before a catastrophic failure occurs and its failure does not constitute a catastrophic failure. Its failure allows a braking fluid to rush into a sealed vacuum chamber containing the flywheel so that catastrophic failure of the flywheel is prevented by the braking action of the fluid. Seelinger, on the other hand, attempts to minimize the consequences of the catastrophic failure after it has occurred.

Energy storage devices of the flywheel type are also disclosed in U.S. Pat. No. 3,208,303 to Durouchoux and U.S. Pat. No. 3,368,624 to Clerk.

SUMMARY OF THE INVENTION

An object of the present invention is to prevent catastrophic failure of the flywheel. This objective is accomplished by constructing the flywheel from flexible materials such as rope, the flexible material having at least one element of lesser tensile strength than the other elements. Should one or a few of the weaker elements fail, they will break a glass tube which is in communication with a braking fluid reservoir, thereby allowing the braking fluid to enter the vacuum housing containing the flywheel. This causes the flywheel to be decelerated in a relatively gentle, non-catastrophic manner.

Another object of the present invention is to avoid vibrations and instabilities which can lead to destruction of the flywheel. This is accomplished by making the flywheel of a flexible material, such as rope, rather than of a rigid material, and suspending the flywheel in a way that transmittance of vibration to the shaft is avoided.

Still another object of the present invention is to provide a highly efficient energy storage device.

BRIEF DESCRIPTION OF THE DRAWING

The FIGURE is a partial vertical cross section of the invention.

DETAILED DESCRIPTION OF THE INVENTION

In the figure, an inertial energy storage device 10 comprises a flywheel 12 made of rings of endless strands. The flywheel is supported by a suspension net 16 which is rotationally mounted on stationary shaft 18 by bearing 20. Centering strands 14 and oversized bearing 36 serve as a limiting guide in case of gross imbalances caused by failure of individual strands. Bearing 36 is not attached to shaft 18, but, rather, is mounted essentially coaxially with shaft 18 with a cylindrical space between bearing 36 and shaft 18. If the flywheel is slightly imbalanced, the flywheel and bearing 36 will rotate around an axis which is very slightly unparallel to the axis of the shaft. This is possible because of the spacing between the shaft and bearing 36. This design prevents the transmittal of vibrations from the flywheel to the shaft via bearing 36. There may be a slight migration of vibrations to the shaft through suspension net 16 and bearing 20, but since suspension net 16 is not rigid, this effect will be minor. Bearing 36 touches the shaft only in case of gross imbalances, thereby guiding the flywheel to prevent it from touching housing 22.

The aformentioned parts are enclosed in vacuum-tight housing 22. Braking fluid reservoir 24 is mounted on housing 22. Sealed glass tubes 26 communicate braking fluid reservoir 24 with vacuum-tight housing 22. Housing 22 is rotationally mounted on stationary base 28 by bearing 30. Rotation brake 32 made of an abrasive braking material is situated tightly between housing 22 and base 28 to provide braking in addition to the braking of the braking fluid.

Flywheel 12 is preferably made of endless strands of nylon, dacron or similar fibers, several of which may be twisted or interwoven around each other in the usual way of rope making. For example, a strand, which may contain a plurality of individual fibers, is twisted around a similar strand forming a larger strand, which is in turn twisted around other larger strand(s) until the flywheel is finally completed. Preferably, the flywheel is constructed so that each of the small strands is exposed at least once to the outer surface of the flywheel.

In order to insure that catastrophic failure of the flywheel will not occur, one or more of the strands or parts thereof will be made of a material having a substantially lower tensile strength than the vast majority of the strands. This guarantees that the weaker strands will fail long before the other strands in case safe rotational velocities are exceeded.

One or more of the broken, weaker strands or fibers will pull out of the flywheel slowly due to the fact that it is intertwined with the other strands. The whiplashing action of the broken strands or fibers will break the sealed glass tubes 26 causing the vacuum-tight chamber to be flooded with braking fluid from reservoir 24. The vacuum in housing 22 causes the braking fluid to be sucked into housing 22.

Rotational energy is further dissipated in the form of heat by rotation brake 32. Rotation brake 32 allows the transfer of momentum to base 28 at a reasonable rate.

Power may be taken directly from the flywheel or it may be taken indirectly in the form of electricity via the rotation brake 32 and stator 34 of the motor/generator.

It is also possible to interweave metallic strands in an appropriate way into the rope ring thus providing means to introduce into or extract energy out of the rope ring by electromagnetic induction.

What is claimed is:

1. An inertial energy storage device comprising:
   a housing;
   a shaft located within said housing;
   a flywheel rotationally suspended from said shaft and constructed of a plurality of strands of flexible material;
   a braking fluid reservoir; and
   rupturable means connecting said reservoir with the interior of said housing;
   said material including at least one strand which will fail prior to the failure of the remaining strands and which will pull out from the remaining strands and rupture said rupturable means such that the braking fluid will enter the housing and provide positive braking of the flywheel.

2. The device of claim 1, wherein the flywheel is constructed of interwoven strands.

3. The device of claim 2, wherein the strands are interwoven so that each strand is exposed to the surface of the flywheel at least once.

4. The device of claim 1, wherein the flywheel is constructed of twisted strands.

5. The device of claim 4, wherein the strands are twisted so that each strand is exposed to the surface of the flywheel at least once.

6. The device of claim 1, further comprising a shaft, from which the flywheel is rotationally suspended by flexible material, whereby the transfer of vibrations from the flywheel to the shaft is minimized.

7. The device of claim 6, wherein the flywheel is suspended by rope.

8. The device of claim 1, wherein:
   the flywheel is suspended by flexible material.

9. The device of claim 1, further comprising a stationary base on which the housing is rotationally mounted; and a rotation brake situated between and contiguous to the housing and the base.

10. The device of claim 1, further comprising metallic strands interwoven in the material of the flywheel for enabling.

11. The device of claim 1, wherein the housing is vacuum-tight and maintained under a vacuum, whereby the braking fluid will be sucked into the housing after the rupturable means is ruptured.

12. The device of claim 1, further comprising a centering bearing essentially coaxial with and spaced apart from said shaft; and centering strands extending from the centering bearing to the flywheel for axially guiding the flywheel.

* * * * *